(12) United States Patent
Tuset Peiró et al.

(10) Patent No.: US 10,142,765 B2
(45) Date of Patent: Nov. 27, 2018

(54) METHOD AND APPARATUS FOR SENDING AND RECEIVING DATA IN A MACHINE TO MACHINE WIRELESS NETWORK

(71) Applicant: FUNDACIÓ PER A LA UNIVERSITAT OBERTA DE CATALUNYA, Barcelona (ES)

(72) Inventors: Pere Tuset Peiró, Barcelona (ES); Xavier Vilajosana Guillen, Barcelona (ES)

(*) Notice: Subject to any disclaimer, the term of this patent is extended or adjusted under 35 U.S.C. 154(b) by 0 days.

(21) Appl. No.: 14/894,780

(22) PCT Filed: May 31, 2013

(86) PCT No.: PCT/EP2013/061296
§ 371 (c)(1),
(2) Date: Nov. 30, 2015

(87) PCT Pub. No.: WO2014/191052
PCT Pub. Date: Dec. 4, 2014

(65) Prior Publication Data
US 2016/0112824 A1 Apr. 21, 2016

(51) Int. Cl.
*H04W 4/00* (2018.01)
*H04W 72/04* (2009.01)
(Continued)

(52) U.S. Cl.
CPC ............ *H04W 4/005* (2013.01); *H04W 4/70* (2018.02); *H04W 56/001* (2013.01);
(Continued)

(58) Field of Classification Search
CPC . H04W 28/044; H04W 4/005; H04W 56/001; H04W 72/0446; H04W 74/08;
(Continued)

(56) References Cited

U.S. PATENT DOCUMENTS

2007/0211751 A1* 9/2007 Yoshikawa ....... H04W 74/0825
370/447
2011/0170515 A1* 7/2011 Kim .................... H04W 72/042
370/330
(Continued)

FOREIGN PATENT DOCUMENTS

WO 2014191052 A1 12/2014

OTHER PUBLICATIONS

International Search Authority, "International Search Report and Written Opinion," PCT/EP2013/061296, dated Jan. 28, 2014.
(Continued)

*Primary Examiner* — Robert J Lopata
(74) *Attorney, Agent, or Firm* — Benjamin A. Balser; Next IP Law Group

(57) ABSTRACT

Method and apparatus for sending and receiving data in a wireless machine to machine communication network comprising at least a gateway (2) and a plurality of nodes (4), implementing an hybrid Medium Access Control protocol to access the shared medium. In order to prevent collisions when sending data transmissions (26), nodes (4) request access to the medium with access request packets (25), and are informed by the gateway (2) if said access request packets (25) are received correctly or if a collision occurred. According to the feedback information (24) provided by the gateway (2), nodes (4) are organized in a distributed queuing system with separate queues collision resolutions and data transmissions (26). Time slots (19) with fixed length are used, divided into three separate subperiods for feedback information (24), access request packets (25) and data transmissions (26). The method and apparatus further implements channel hopping to reduce interferences from adjacent networks.

15 Claims, 8 Drawing Sheets

(51) Int. Cl.
  *H04W 74/08*   (2009.01)
  *H04W 56/00*   (2009.01)
  *H04W 4/70*    (2018.01)
  *H04W 88/16*   (2009.01)

(52) U.S. Cl.
  CPC ....... *H04W 72/0446* (2013.01); *H04W 74/08* (2013.01); *H04W 74/085* (2013.01); *H04W 88/16* (2013.01)

(58) Field of Classification Search
  CPC ... H04W 74/085; H04W 88/16; H04W 28/02; H04W 28/0205; H04W 28/021; H04W 28/0247; H04W 28/0252; H04W 28/0257; H04W 28/0263; H04W 28/0268; H04W 28/0273; H04L 47/10
  USPC ......................................................... 370/235
  See application file for complete search history.

(56) References Cited

U.S. PATENT DOCUMENTS

| | | | | |
|---|---|---|---|---|
| 2012/0207062 | A1* | 8/2012 | Corbellini | H04W 74/08 370/256 |
| 2013/0163491 | A1* | 6/2013 | Singh | H04W 52/0216 370/311 |
| 2013/0272342 | A1* | 10/2013 | Pustovalov | H04L 1/1845 375/130 |
| 2013/0308530 | A1* | 11/2013 | Yang | H04W 8/22 370/328 |
| 2014/0071959 | A1* | 3/2014 | Ghosh | H04W 72/0426 370/336 |
| 2014/0229519 | A1* | 8/2014 | Dietrich | H04L 67/10 709/201 |
| 2015/0117257 | A1* | 4/2015 | Yi | H04L 1/00 370/254 |
| 2015/0208436 | A1* | 7/2015 | Seok | H04W 74/08 370/329 |
| 2015/0341880 | A1* | 11/2015 | Seok | H04W 52/0216 370/350 |

OTHER PUBLICATIONS

Alonso-Zarate J et al: "Enhanced Operation of DQMAN Based Wireless Ad Hoc Networks", Wireless Communication Systems, 2007. ISWCS 2007. 4th International Symposium On, IEEE, Piscataway, NJ, USA, Oct. 2007 (Oct. 2007), pp. 632-636, XP031166846, ISBN: 978-1-4244-0978-5 section II.

Alonso L et al: "A near-optimum MAC protocol based on the distributed queueing random access protocol (DQRAP) for a COMA mobile communication system", IEEE Journal on Selected Areas in Communications, IEEE Service Center, Piscataway, US, vol. 18, No. 9, Sep. 2000 (Sep. 2000), pp. 1701-1718, XP011450080, ISSN: 0733-8716, 001: 10.1109/49.872957 section II.

* cited by examiner

METHOD AND APPARATUS FOR SENDING AND RECEIVING DATA IN A MACHINE TO MACHINE WIRELESS NETWORK

CROSS REFERENCE TO RELATED APPLICATIONS

This application claims priority to PCT application Ser. No. PCT/EP2013/061296 filed on May 31, 2013, which is incorporated by reference herein.

BACKGROUND OF THE INVENTION

Field of the Invention

The present invention has its application within the telecommunications sector and, in particular, in medium access control protocols in a wireless machine-to-machine communication network.

Related Art

Machine-to-machine (M2M) communication networks provide remote management of a plurality of distributed nodes with sensing and/or actuating capabilities, and enable to obtain data remotely from said nodes or control devices connected to said nodes. The nodes are controlled by one or more gateways, the gateways being also responsible of communications with other elements of the network (such as servers or applications), and with external networks. Communication between gateway and nodes can be either wired or wireless, in the latter case typically operating in the Industrial, Scientific and Medical (ISM) bands. Wireless M2M communication networks can be applied to a variety of fields, including smart metering (electricity, water and gas utilities), remote sensing of physical constants (river water levels, bridges safety, etc.), radiofrequency identification and localization of objects, and remote actuating over physical devices (street lights, traffic lights), among others.

In a typical wireless M2M network, a very large number of nodes need to be supported, each of them producing small amounts of traffic. Typically, uplink traffic (traffic from the node to the gateway) is generated simultaneously at a plurality of nodes as a result of a request from the gateway. As a consequence, step-like traffic may be generated (that is, a large sudden increase in the traffic load of the network), when a large amount of nodes try to access the medium simultaneously, even if each of them is trying to send a small amount of data. In addition to as a response to requests from the gateway (pull communications), traffic can be generated spontaneously at the nodes (push communications), for example as a result of an alarm triggered by a sensor. In this case, communication delays are particularly critical, and the information from the node needs to be sent without waiting for a periodical survey from the gateway. Furthermore, a particular event may generate an alarm simultaneously in multiple nodes, causing them to try to access the medium at the same time. This scenario also results in a step-like traffic that needs to be properly handled by the network.

Therefore, M2M networks require MAC (Medium Access Control) protocols that are capable of efficiently handling both a low load communication scenario in which traffic is generated randomly at the nodes, and a situation in which a very large number of nodes try to access the medium simultaneously as per gateway request. This is challenging for conventional MAC protocols as contention-based protocols cannot handle heavy traffic, whereas deterministic protocols require a priori knowledge of the application QoS (Quality of Service) requirements (bandwidth, delay, etc.), as they incur in heavy energy and network efficiency penalties when they need to adapt to changing conditions.

Some additional problems inherent to wireless M2M networks need to be addressed by the MAC protocol. First, the number of nodes may be unknown a priori, and may vary during the operation of the M2M network, as additional nodes are deployed or some of the nodes are removed. The MAC protocol must hence be able to synchronize the new nodes and allow them to receive and transmit data in a deterministic and efficient way, i.e. without packet collisions. Second, ISM bands do not require a license, which may cause interference from adjacent networks operating in the same frequency band. Thus, the MAC protocol must be able to withstand this interference and reduce its impact in ongoing communications. Third, nodes in a wireless M2M network typically operate using batteries, which have to last for long periods of time as they cannot be changed frequently due to the cost overhead it would represent. Therefore, it is of critical importance that the MAC protocol minimizes energy consumptions derived from data transmission and reception.

All the above particularities of wireless M2M networks need to be addressed when designing an appropriate MAC protocol, and in particular, when designing network synchronization, data transmission, and robustness against interferences.

Regarding network synchronization, two main alternatives are known: preamble sampling and time synchronization. In systems based on preamble sampling, nodes stay by default in a sleep state (radio communication means turned off), periodically turning on the radio to sample the communication channel for a short period of time. During said short periods, the nodes measure the energy level present in the communication channel and determine if a packet is being transmitted. In case energy is present in the channel and a packet is successfully received, it is used to synchronize the node, which either keeps the radio on to transmit or receive a packet right after or goes back to the sleep state and schedules to wake up in the future (for example, after a certain period of time determined by the packet contents). Different preamble sampling mechanisms are known. For example, this concept can be implemented by modulating a carrier, enabling the receiving node to detect that the signal is present in the channel and to decode said signal. In another example, the gateway sends a plurality of short packets, so the node can detect that a signal is being transmitted over the channel, and is able to correctly receive the packet.

Using the preamble sampling approach in a M2M context, whenever the gateway has some data to receive from the end nodes, it sends a train of small packets (wake-up packets) for, at least, the same length of the end nodes sampling time, therefore ensuring that all nodes will receive at least one of the packets and act accordingly, i.e. keep the radio on to receive a packet. Preamble sampling approaches avoid maintaining a permanent synchronization between gateway and nodes, which is interesting for networks that need to support high node mobility. This approach can be used in both uplink and downlink communications, thus reducing energy consumption both at the gateway and the nodes. However, by periodically turning on the radio, a considerable amount of energy is still consumed. Furthermore, if the nodes are in sleep state for long periods, energy consumption at said nodes is reduced, but as a trade-off, the gateway needs to send more wake-up packets, hence increasing its energy consumption and reducing the data capacity of the channel. It should also be noted that in scenarios with high traffic load, the preamble sampling process needs to be constantly performed, increasing energy consumption.

Alternatively, time synchronization is based on a common master clock between the gateway and all the nodes. The master clock provides a common time reference for all the elements of the network, hence synchronizing all communications. Once all the elements are synchronized, the gateway distributes the network scheduling to all the nodes, which can therefore determine when to wake up for data transmission and/or reception of data packets. The main disadvantage of this configuration is that if burst traffic is expected (large amounts of traffic concentrated in short periods of time), it is necessary to reserve time slots that are seldom going to be used, therefore misusing network resources and increasing energy consumption. Furthermore, whenever a node joins or leaves the network, the schedule needs to be recalculated and redistributed, which implies a large energetic cost and a significant network efficiency reduction.

There are two types of time synchronization, namely hard and soft. Hard synchronization occurs when a node wants to join the network and needs to align its internal clock with the master clock. For this purpose, the gateway periodically transmits a control packet (beacon) comprising information of the master clock. In order to synchronize with the gateway, nodes turn on the radio and wait until a beacon from the gateway is received. Upon receiving the beacon the node clock is aligned to the gateway, allowing the node to communicate with the gateway. The main advantage of time synchronization over preamble sampling is that it reduces the energy overhead derived from periodically sampling the channel for on-going activity. However, if synchronization is lost the node needs to start the synchronization process. Thus, maintaining synchronization is a crucial aspect of time-synchronized networks. Soft synchronization (also named re-synchronization) is required to periodically to compensate the relative drifts between master and node clocks, i.e. construction imperfections and temperature changes, and avoid losing synchronization. Typically nodes periodically re-synchronize using the beacon transmitted by the gateway.

Network synchronization needs to be combined with a medium access technique that enables data transmission, which in traditional MAC protocols for M2M communications are either based on random or deterministic access. For example, a preamble sample system based on trains of waking-up packets can be used in combination with a random medium access, such as slotted Aloha, to enable data transmission for the nodes. Likewise, random access can also be applied to networks synchronized with a master clock transmitted by the gateway in the beacon packet.

In random access MAC protocols, whenever a node has a packet to transmit to the network, the node follows a predefined set of rules without central coordination from the gateway. Since nodes can access the shared medium at any random time, a collision between two packets may occur (that is, two nodes send data simultaneously using the same channel). In case of collision between two or more data packets, the data cannot be correctly decoded, and the data packets need to be transmitted again until no collision occurs.

The first random access MAC protocol was Aloha, in which nodes may try to transmit a packet at any time regardless of other stations. In low traffic scenarios, the chance of collision is low, but when traffic increases, so do collisions, greatly reducing network performance (network performance up to 18%). This mechanism was improved with slotted Aloha, in which nodes can only start transmitting at the beginning of time slots of fixed length. This reduces the chance of collision, but still provides poor performance in scenarios with high traffic (up to 36%).

To further increase network performance, Carrier Sense Multiple Access (CSMA) mechanisms were introduced, in which the nodes monitor the communication medium prior to packet transmission. If a node detects an ongoing transmission from another mode, it refrains from sending any additional transmission for a certain amount of time, thus avoiding the packet collision. According to different implementations, when a node detects an ongoing transmission, the node may either keep monitoring the medium until the end of the transmission (1-persistent CSMA), or only check the medium again after a certain time (non-persistent CSMA). 1-persistent CSMA improves network performance, whereas non-persistent CSMA reduces energy consumption. Nevertheless, collisions may still occur in CSMA systems. For example, two different nodes that are outside of each other's communication range, may transmit data to the same gateway. Since transmissions from the first node do not reach the second node, said second node may consider the medium is free and start transmitting, resulting in a collision and therefore requiring the data to be retransmitted.

This problem can be solved by using data communication requests (RTS, Request to Send), which are answered by permissions from the gateway (CTS, Clear to Send). Previous to transmitting a data packet, the node transmits a RTS in order to reserve the channel, and waits to receive a CTS from the gateway. Since nodes cannot transmit without receiving a CTS message, collisions between data packets are prevented, although collisions between RTS messages may still occur. Additionally, this system reduces network efficiency, especially in low-traffic scenarios, as a consequence of the time used for transmitting and receiving RTS/CTS packets.

In deterministic access MAC protocol, network resources are assigned to the nodes (either statically or dynamically), by means of time, frequency and/or code multiplexing. Static deterministic access is not suitable for wireless M2M communications because the network has finite resources that would be divided among a great number of nodes that would very seldom use them to transmit data, greatly reducing network efficiency. Dynamic deterministic access is also not suitable for wireless M2M networks, as the number of nodes is highly dynamic and would require to constantly reassign network resources, which implies recalculating and redistributing the network schedule each time a node joins or leaves the system. Additionally, in order to join the network and request resources, nodes need to be able to communicate with the gateway on an ad hoc basis, i.e. without any previous knowledge of the status of the communication network. This results in resources statically allocated for management traffic and, as a consequence, a reduction in network performance.

Finally, several techniques to increase communication robustness against interferences are known. This issue is particularly critical in wireless M2M communication networks, since no license is required to operate in the ISM bands. Therefore, nearby M2M networks can be operating in overlapping frequencies, hence hindering communications unless specific measures against this problem are taken. Some of the alternatives known in the state of the art are Direct Sequence Spread Spectrum (DSSS), Frequency Hopping Spread Spectrum (FHSS) and Channel Hopping (CH).

Direct Sequence Spread Spectrum is based on spreading a baseband signal into a larger bandwidth than strictly required to improve resistance against noise and interference. It also enables multiple users to share a single channel by using different codes in their communications. In order to obtain a DSSS signal, the data to be transmitted is multiplied by a pseudo-random signal, that is, a sequence of positive and negative values (1 and −1), at a frequency higher than that of the baseband signal.

Frequency Hopping Spread Spectrum is based on periodically changing a carrier that modulates the baseband signal. The carrier that modulates the baseband signal is selected using a pseudo-random sequence that is known by both the transmitter and the receiver. It should be noted that in a FHSS scheme, the rate at which the carrier changes is of the same order of magnitude as the baseband signal rate.

Finally, channel hopping is based in switching the channel used for the transmission of each packet, following a sequence known by the transmitter and the receiver. The main difference between with FHSS is the rate at which the carrier frequency changes. Whereas in FHSS the change can take place at a symbol level (each symbol is transmitted with a different carrier), in CH the channel is changed for each complete packet.

Recently, hybrid MAC protocols have been proposed for data transmission. These hybrid MAC protocols do not require a central entity to calculate and distribute network schedule, yet enable nodes to communicate with each other while minimizing the probability of packet collision. An example of an hybrid MAC protocol is Distributed Queuing (DQ), originally developed for distributing cable television signals, and later adapted to Wireless Cellular Systems (GSM) and Wireless Local Area Networks (WLAN). In DQ-based systems, data packet transmission is self-organized among nodes using two queues. The first queue, named Collision Resolution Queue (CRQ), enables nodes contending for packet transmission to resolve their status by means of applying a blocked Split Tree Algorithm (STA) in consecutive attempts. The second queue, named Data Transmission Queue (DTQ), enables nodes that have successfully resolved their collision by means of using the CRQ and the STA to transmit a data packet in the network without contention. U.S. Pat. Nos. 6,292,493 B1 and 6,408,009 B1 present two examples of hybrid medium access using Distributed Queuing. Nevertheless, these examples have not been optimized for wireless M2M networks and, therefore, do not deal with its particular problems, such as the use of a shared channel for uplink and downlink communications among a high and variable number of nodes. Furthermore, they do not provide robust communications against interferences nor are energetically efficient.

Taking into account all the aspects presented above, MAC protocols known in the state of the art fail to provide an efficient solution for medium access control in wireless M2M networks with a large and variable number of nodes with limited energy resources and which can operate both in pull and push communications. There is hence the need of a method and apparatus for data transmission and reception in such networks, which provides high network efficiency both in light-traffic and heavy-traffic scenarios, while preserving low power consumption at the nodes and communication robustness against interferences.

SUMMARY OF THE INVENTION

The current invention solves the aforementioned problems by disclosing a hybrid access MAC protocol for wireless M2M networks capable of handling a great number of nodes both in push and pull communications, with low energy consumption and robustness against interferences. In a first aspect of the invention, a method for sending and receiving data in a wireless M2M network is disclosed. The network comprises at least one gateway and a plurality of nodes managed by said at least one gateway. Both the nodes and the gateway share the same medium, for uplink and downlink communications, which is organized into time slots of a fixed length. The medium comprises one or more transmission frequencies. Hence, a single common transmission frequency may be used for transmission of both uplink slots (slots with communications from the node to the gateway) and downlink slots (slots with communications from the gateway to the node). Transmission frequencies are typically located in the ISM band. According to the method of the invention, uplink time slots are divided in three subperiods of different length:

A first subperiod (feedback sub-period), in which the gateway sends feedback information to the nodes (FBP, feedback packet) regarding the previous slot. The FBP comprises information determining the status of the access requests received at the gateway during the preceding time slot. Preferably, the FBP also comprises information determining the status of the data transmissions received during the preceding time slot.

A second subperiod (access subperiod), in which nodes send data transmission requests (ARP, access request packets) to the gateway. The access subperiod is preferably divided into minislots, that is, a plurality of time frames of a length corresponding to the length of an ARP. According to the number of nodes sending ARP messages simultaneously, each mini-slot of the access subperiod can have three outcomes: empty (no ARP sent), success (a single ARP sent) or collision (multiple ARP sent).

A third subperiod (data subperiod), in which an end node that has been granted access to the medium transmits a data packet to the gateway.

The method comprises determining at the gateway if a collision occurs during each mini-slot of the access subperiod, that is, if two or more nodes send an ARP simultaneously. Preferably, collision detection comprises performing a CRC validation of the ARP messages. Information regarding the occurrence of collisions is sent by the gateway in the feedback packets, therefore informing the nodes if their access request was properly received or if it needs to be transmitted again. In case an ARP sent by a node is received by the gateway without collisions, the node is queued in a first queue (DTQ, Data Transmission Queue), whereas if the ARP sent by the node is part of a collision (which is notified to the node in the FBP), the node is queued in a second queue (CRQ, Collision Resolution Queue). DTQ determines which node gets permission to transfer data during the data subperiod (that is, only the node at the head of the DTQ can send data transmissions), whereas CRQ determines when a node which has been part of a collision is granted permission to try to send an ARP again in the access subperiod. The nodes also use the information in the FBP to update their position in the CRQ. That is, nodes queued in the CRQ can only send ARPs when at the head of the queue. When an ARP from a node at the head of the queue is correctly received, the rest of the queued nodes update their position accordingly.

Preferably, the gateway also uses the FBP to inform the nodes if a data packet was correctly received in the preceding time slot, typically by performing a CRC check. This way, if the data packet was correctly received, the node at the head of the DTQ can leave the queue, and all the nodes managed by the gateway can update their position in the DTQ. If the data packet is not received correctly (for example due to interference or collision), the node at the head of the queue tries to send the data packet again in the next uplink time slots, and the rest of the nodes in the DTQ maintain their position.

With this distributed queuing scheme, the network performance is optimized to both light and heavy traffic loads. When the network traffic load is light, the method behaves as a random access mechanism since the nodes can transmit their data packets shortly after they are available. When the traffic load increases, for example as a result of a broadcast request from the gateway, the method transitions to a reservation-based scheme that reduces packet collisions, allowing to maintain a good network performance.

Preferably, since the information needed to update the queues is transmitted in every feedback subperiod, the nodes can efficiently schedule turning off their radios to preserve energy. In particular, during the data subperiod, all the nodes except the node at the head of the DTQ (and the gateway) can turn off their radios. Also, nodes without data packets waiting to be sent can turn off their radios during the access subperiod. Nodes with data packets to be sent, but which are waiting on the CRQ can also turn off their radios, except for the node at the head of the CRQ. Using this approach it is possible to achieve very-low duty cycling rates that enable nodes to operate using batteries for long periods of time.

Preferably, the method comprises transmitting from the gateway a periodic control signal (beacon) which defines which time slots are reserved for downlink data transmissions (downlink time slots), and which time slots are reserved for uplink data transmissions (uplink time slots). Also preferably, the beacon is used by the nodes to synchronize their clocks with the gateway.

Preferably, the method implements a channel hopping strategy by changing the channel used to transmit at each time slot. More preferably, the sequence of channels over which the time slots are transmitted is determined by the gateway and transmitted to the nodes in the beacon signal. Therefore, the method mitigates the effects of interference and multi-path propagation at the physical layer in ISM bands. The per-slot channel hopping scheme enables to adapt to the interference caused by adjacent networks operating in the same band, as well as to reduce the effects of multipath propagation caused by shadowing and fading.

In another preferred option, ARP are transmitted using a first modulation, and data and FBP are transmitted using a second modulation, wherein the first modulation is less robust than the second modulation against interferences from other nodes. This way, two simultaneous ARP with disparate powers are more likely to be detected as a collision.

In a second aspect of the present invention, a gateway of a wireless M2M network is disclosed, the gateway managing a plurality of nodes with a shared medium for uplink and downlink communications. The medium is organized into a plurality of time slots of a fixed length, each uplink time slot being divided into three subperiods (feedback subperiod, access subperiod, data subperiod). The gateway is configured to receive ARPs from the nodes in the access subperiod, data packets from the nodes in the data subperiod, and to send feedback information in the feedback subperiod. Furthermore, the gateway is configured to detect collisions in the access subperiod and to inform the nodes of said collisions by means of the feedback information. The gateway is also configured to send in the FBP the information needed by the nodes to organize themselves into two queues, depending on the occurrence of collisions during the access subperiod. If an ARP is received without a collision, the node sending the ARP enters the DTQ at its last position. If an ARP is part of a collision with other messages, the node sending the ARP is queued in the CRQ.

In a third aspect of the present invention, a node of a wireless M2M communication network is disclosed, the network further comprising a plurality of nodes managed by a gateway. The gateway and the nodes share the same medium for uplink and downlink communications, said medium being organized into a plurality of time slots of fixed length. The node of the invention is configured to send an ARP during a first subperiod of an uplink time slot when said node has data packets to transmit. When access to the medium is granted to the node, the node sends the data packets during a second subperiod of the time slot. Finally, the node receives feedback information from the gateway during a third subperiod of the time slot. The feedback information indicates if an ARP from the node has been received at the gateway with or without collisions. Depending of the feedback information, the node is queued in the DTQ (no collisions) or the CRQ (when a collision has occurred).

In a fourth aspect of the present invention, a wireless M2M communication network is disclosed, the network comprising at least a gateway and a plurality of nodes with a shared medium for uplink and downlink communications, which are organized into time slots of a fixed length. The nodes and the gateway are configured to divide each uplink time slot into three subperiods (access subperiod, data subperiod and feedback subperiod). The nodes are configured to send data communication requests to the gateway in the access subperiod, and data communications in the data subperiod when the nodes are granted their data communication requests. The gateway is configured to determine if a collision occurs in the access subperiod, and queue nodes sending ARPs in said access subperiod according to the presence or absence of collisions, informing the nodes of said collisions in the feedback subperiod. If a collision occurs, the node is queued in the collision resolution queue, whereas if the ARP is received without collisions, the node is queued in a data transmission queue.

Finally, in a fifth aspect of the present invention, a computer program is disclosed, comprising computer program code means adapted to perform the steps of the described method when said program is run on a computer, a digital signal processor, a field-programmable gate array, an application-specific integrated circuit, a micro-processor, a micro-controller, or any other form of programmable hardware.

The disclosed invention therefore provides an optimized medium access control for wireless machine-to-machine networks, capable of efficiently handling both light and heavy traffic load scenarios with high network performance. It also reduces the number of collisions, and provides improved collision detection. Furthermore it reduces energy consumption at the nodes, and improves robustness against interferences. These and other advantages will be apparent with the detailed description of the invention.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention.

Note that in this text, the term "comprises" and its derivations (such as "comprising", etc.) should not be understood in an excluding sense, that is, these terms should not be interpreted as excluding the possibility that what is described and defined may include further elements, steps, etc.

Figure 1:
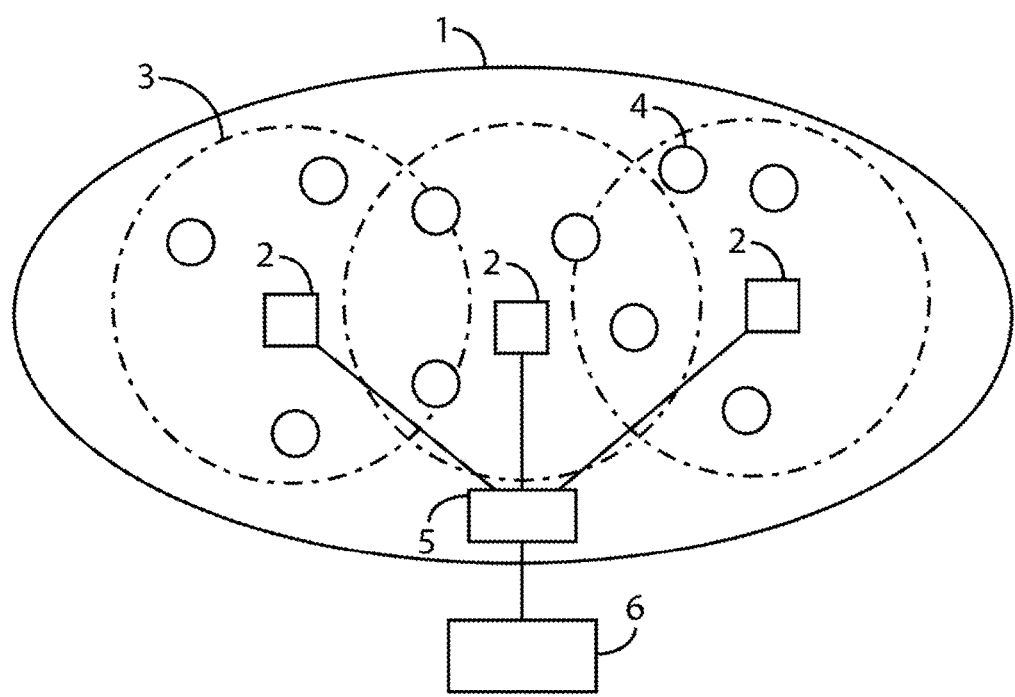
FIG. 1 shows a schematic example of a wireless machine to machine communication network to which the method of the invention is applied.

FIG. 1 shows a machine to machine communication network operating on a sensing and/or actuation area 1. The network comprises a plurality of gateways 2, each gateway having a certain coverage 3. Within the coverage 3 of each gateway 2, the network comprises a plurality of nodes 4, which actuate and/or measure parameters of the sensing and/or actuation area 1. The gateways 2 are also connected to a host system 5, which is also connected to a M2M manager 6. The manager receives the measurements of sensors of the nodes 4 through the gateways 2, and also sends commands to the nodes 4 through the same gateway 2. Communications between nodes 4 and gateways 2 are performed wirelessly, preferably using the ISM bands (i.e. 169 MHz, 315 MHz, 433 MHz, 868 MHz, 915 MHz and 2.45 GHz, among others). Communications between the gateways 2 and the host system 5, and between the host system 5 and the M2M manager 6 can be both wired and wireless. Some examples of M2M networks are remote sensing of physical constants, remote metering of utilities (electricity, water, gas, etc.), and remote actuation over physical devices, such as traffic lights.

Figure 2:
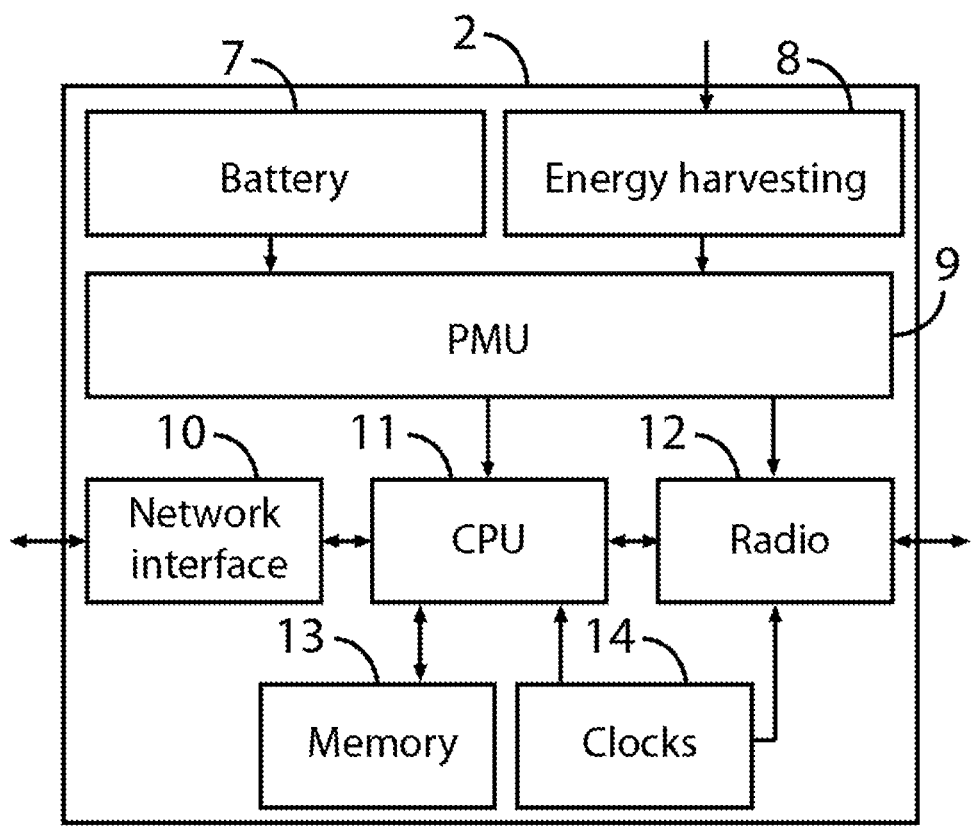
FIG. 2 depicts the elements of a gateway according to a particular embodiment of the invention.

FIG. 2 shows a diagram of a M2M gateway 2, which comprises a battery 7 and energy harvesting system 8, both connected to a power management unit (PMU) 9. Notice that in some particular embodiments of the invention, the gateway 2 can also operate only with battery 7 and only with external energy through the energy harvesting system 8. Also, in another particular embodiment, the gateway can harvest energy directly from the main power. The gateway 2 further comprises a network interface 10 to communicate with the host system 5, a central processing unit (CPU) 11, and a radio 12 to communicate with the nodes. It also comprises a memory 13 for data storage and clocks 14.

Figure 3:
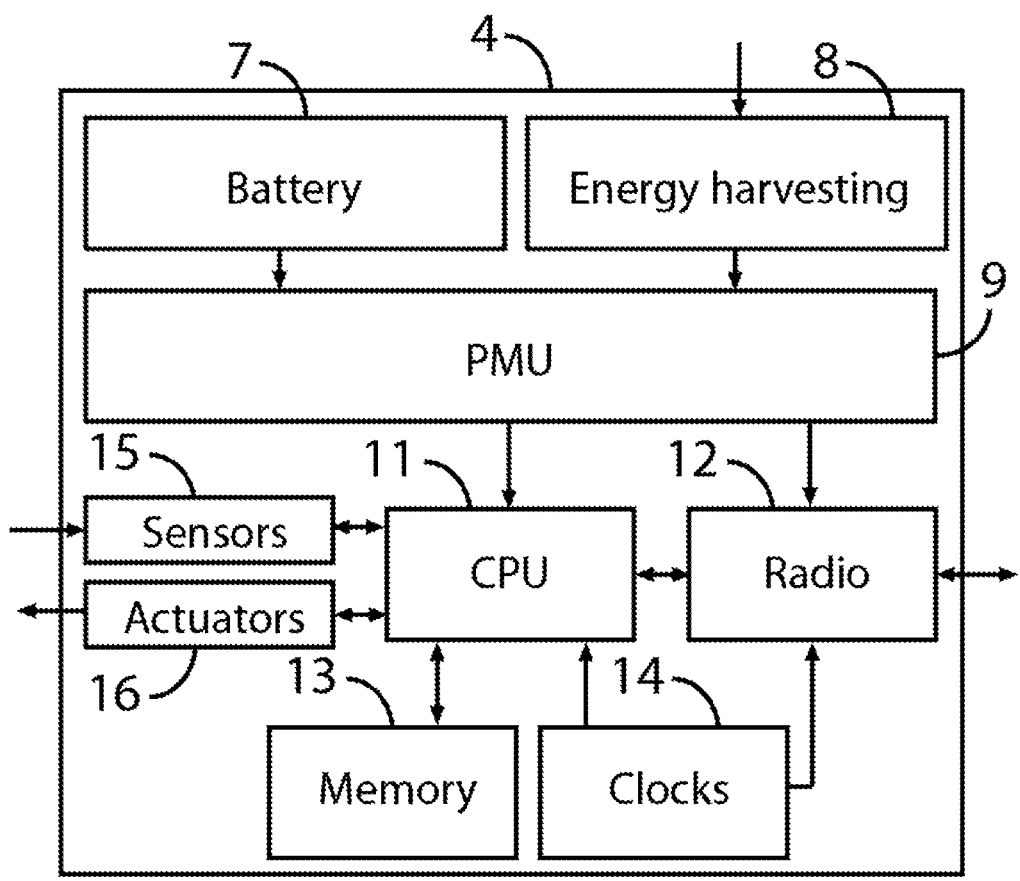
FIG. 3 shows the elements of a node according to a particular embodiment of the invention.

FIG. 3 shows a schematic of a node 4 of the network, also comprising the battery 7, the energy harvesting system 8 and the PMU 9. Notice that in some particular embodiments of the invention, the node 4 can also operate only with battery 7 and only with external energy through the energy harvesting system 8. In all cases, it is desirable to have low energy consumption, being this issue specially critical in nodes operating on batteries 7. The node also comprises a CPU 11, a radio 12 to send and receive communications from the gateway, a memory 13 and clocks 14. Furthermore, the node comprises sensors 15 and/or actuators 16 to interact with the sensing and/or actuating area 1.

Figure 4:
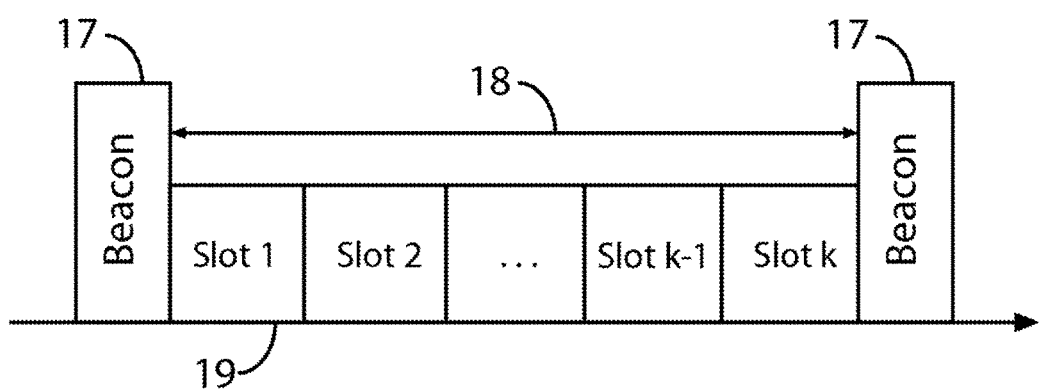
FIG. 4 exemplifies the time multiplexing of particular embodiment of the invention.

The communications between each gateway 2 and the nodes 4 within its coverage 3, follow a time-synchronized medium access control (MAC) protocol, that is, clocks 14 of gateway 2 and nodes 4 are aligned. As shown in FIG. 4, the MAC protocol divides time into time slots 19 of fixed length. A predefined number (k) of consecutive time slots 19 constitute a frame 18, being each frame, which repeats along time, preceded by a control signal (beacon) 17 used for synchronization and management purposes.

Network discovery is achieved by means of the beacons 17 periodically transmitted by the gateway 2 on any of the available channels. Both the time at which the beacons 17 are sent and the channel used to transmit the beacons 17 is configured depending on the requirements of the particular application. In addition, the beacons 17 may contain information regarding the clock 14 of the gateway 2 (master clock) to which nodes 4 need to synchronize in order to join the network. Notice that in some embodiments, the network can be synchronized without beacon 17 including the value of the master clock. If the node knows the duration of the time slots 19, and the beacon 17 informs of the number of slots 19 in a frame 18, the node can determine exactly when each slot and each subperiod starts.

The beacon 17 also comprises other information needed for network operation, such as the amount of slots 19 that follow the beacon 17, which of the slots 19 are reserved for downlink communications and which slots 19 are reserved for uplink communications, and the next channel at which communications will take place.

When a new node 4 is activated within the coverage 3 of a gateway 2 and wants to join the network, the node 4 needs to be synchronized with the gateway 2. For this purpose, the node 4 turns on the radio 12 and scans the medium until a beacon 17 from one or more gateways 2 is received. This scan is typically performed over all the channels at which network communications take place. From all the beacons 17 received, the node 4 decides which one is more suitable for its operation, and synchronizes its clocks 14 to the master clock. Note that beacons 17 are used for time synchronization not only during network discovery, but also during normal network operation, as relative drifts between the clocks of the gateway 2 and nodes 4 may occur as a consequence of temperature changes, component aging, etc.

In nodes 4 which do not have data to be transmitted, synchronization is performed exclusively through the beacons 17, by turning on the radio 12 slightly before the beacon 17 is expected to be received. If the beacon 17 is not received, synchronization is considered to be lost, and the synchronization process starts again. On the contrary, nodes 4 with data to be transmitted can automatically perform resynchronization by correcting time drifts with the beginning of each time slot.

Once a node 4 has joined the network and its clock 14 is synchronized, communications with the gateway 2 can be performed. Since the medium is shared by uplink and downlink communications, the gateway 2 determines which time slots 19 of each frame 18 are used for downlink communications and which time slots 19 are used for uplink communications, and transmits this scheduling information to the nodes 4 in the beacon 17. For each downlink slot 19, the beacon 17 also determines to which nodes 4 the data comprised in that slot 19 is addressed to. The addressed nodes 4 of each time slot 19 can be a single node (unicast), a group of nodes (multicast) or all the nodes (broadcast). This information allows nodes 4 to turn off the radio when downlink data is not addressed to them, therefore reducing energy consumption. Furthermore, this scheme enables scheduling flexibility, as when no downlink communication is required in a given frame 18, all slots 19 can be devoted to uplink communications, thus maximizing network packet throughput.

Figure 5:
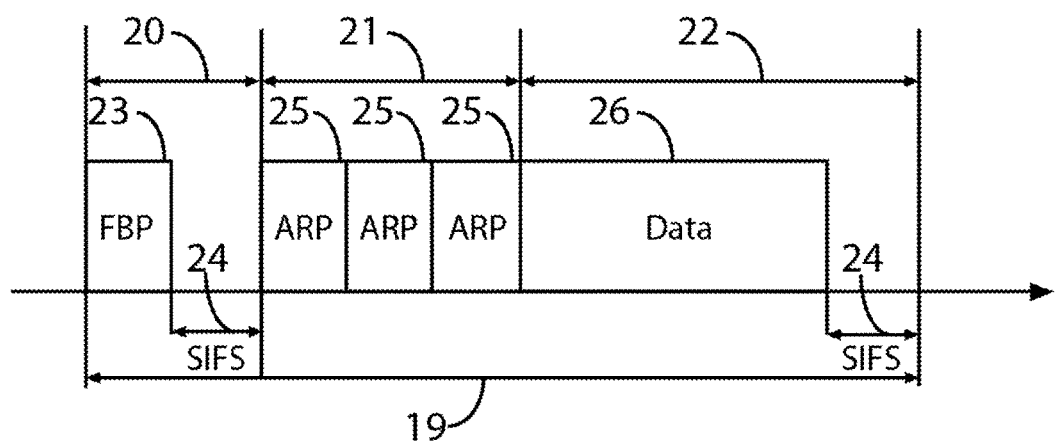
FIG. 5 shows the elements and subperiods comprised within an uplink time slot.

FIG. 5 shows the organization of an uplink time slot 19, used by the network to implement an hybrid access MAC protocol. The time slot 19 is divided into three subperiods, namely feedback subperiod 20, access subperiod 21, and data subperiod 22. Short Inter-Frame Spaces (SIFS) and Long Inter-Frame Spaces (LIFS) 24 are included at the end of the data subperiod 22 and feedback subperiod 20 in order to enable the gateway and nodes to process the packet and execute protocol rules.

The access subperiod 21 of each slot 19 enables nodes 4 to request permission to transmit a data packet 26 to the network during a data subperiod 20. These requests are performed by sending Access Request Packets (ARP) 25. For this purpose, the access subperiod 21 is divided into a plurality of mini-slots (typically three although a different number can be used). When a node 4 wants to transmit a data packet 26, it sends an ARP 25 during a mini-slot of the access subperiod 21. The specific mini-slot is selected randomly among the available mini-slots. Since there is no arbitration in the ARP 25 transmission, multiple nodes can send ARPs 25 during the same mini-slot of a given time slot 19, resulting in a collision. Therefore, there are three possible outcomes for each mini-slot: the mini-slot is empty (no ARP 25 transmission), an ARP 25 is correctly transmitted (only one node 4 sending ARP), or a collision occurs (multiple ARP 25 sent from multiple nodes 4 during a mini-slot). During the access subperiod 21 of uplink time slots 19, the gateway 2 listens to the medium and uses collision detection means comprised in its CPU 14 to determine which of the aforementioned outcomes occurs in each mini-slot. For this purpose, the gateway 2 combines energy measurements and ARP detection and validation techniques.

First, the gateway 2 determines the energy level of the channel. If energy is detected, that is, if incoming energy on the channel is over a predefined threshold, at least one ARP 25 is considered to have been sent during the mini-slot. If the energy is below the threshold, the gateway 2 considers that no ARP 25 has been sent. However, interferences and propagation losses may result in false positives and false negatives. For this reason, the gateway 2 also determines if the signal received during a mini-slot with energy above the threshold level corresponds to a valid ARP 25. If there is energy present, but the signal does not correspond to a valid ARP 25, the gateway considers that a collision has occurred. In order to prevent false positives even with ARP 25 detection, which could occur if there is a collision between two perfectly synchronized nodes 4, CRC is incorporated to the ARP 25. Therefore, if an ARP 25 is detected and the CRC is valid, the gateway 2 considers that a single ARP 25 has been sent. If an ARP 25 is detected and the CRC is invalid, the gateway 2 considers that a collision has occurred.

It should be noted that ARP 25 does not include information regarding the node 4 who transmitted it. Instead, ARP 25 comprises a field with a randomly generated number. This randomly generated number is included to enable the gateway 2 to inform the nodes 4 which ARP 25 was correctly received (by including said randomly generated number in a feedback packet 23). This is particularly important as there is a chance that two nodes 4 transmit an ARP 25 in the same mini-slot and, yet, the outcome of the mini-slot is success instead of collision. For example, using a robust modulation such as FSK (Frequency Shift Keying) or MSK (Minimum Shift Keying) it is possible that the gateway is able to successfully decode the packet due to the capture effect (the signal of the second transmission acts as an interference but does not affect the correct reception of the other signal). After sending an ARP 25 with a randomly generated number, the node 4 checks the following FBP 23. If the FBP 23 comprises that same number, the node 4 considers the ARP 25 transmission a success and enters the DTQ. Otherwise, the node determines that the ARP 25 was not successfully received and enters the CRQ.

The outcome of each mini-slot is communicated by the gateway 2 to the nodes 4 during the feedback subperiod 20 by means of a feedback packet (FBP) 23. In order to properly notify nodes 4 which gain access to the medium, some node identification must be included both in the ARP 25 and FBP 23. The node identification can be a random number generated by each node 4. In that case, it should be taken into account that the chance of two nodes 4 colliding and having the same random identification is low enough as to not interfere with the protocol operation.

Once a node 4 has been granted permission to send data packets 26, said data packets 26 are sent during the data subperiod 22. The access of the nodes 4 to the medium during the data subperiod 22 is managed by the gateway 2 by means of the feedback information comprised in the FBP 23 transmitted during the feedback subperiod 20. Specifically, the FBP 23 comprises information regarding the resolution of the access subperiod 21, that is, the outcome of each mini-slot (empty, collision, or successful ARP 25). For each successful ARP 25, the FBP 23 further comprises the randomly generated number included in said ARP 25, in order to solve the aforementioned capture effect.

Notice that an optional alternative to mitigate capture effect is to use a less robust modulation for the ARP 25, such as On-Off keying (OOK) or Amplitude-Shift Keying (ASK). This way, the interference between two ARP 25 with significantly different powers is more likely to be detected as a collision. It should nevertheless be taken into account that the use of these modulations reduce the energetic efficiency of the protocol. FBP 23 and data packets 26 can be transmitted a more robust modulation such as Frequency-Shift Keying (FSK) or Minimum-Shift Keying (MSK).

The FBP 23 further comprises the result of CRC validation of the data packets 26 received during the data subperiod 22. If the CRC is valid, the node 4 considers that the data has been correctly transmitted. Otherwise, the node 4 retries to send the data in posterior time slots 19. The FBP 23 may comprise information regarding the number of slots 19 remaining in the current frame 18. Additionally, the FBP 23 further comprises information regarding the access resolution and data transmission queues of the distributed queuing system.

The distributed queuing is based on two virtual queues, namely the Collision Resolution Queue (CRQ) and the Data Transmission Queue (DTQ). Each queue is represented in each node 4 by two integer values: the global length of the queue, that is, the number of nodes 4 currently waiting in the queue; and the queue position, that is, the current position of the particular node 4 in the queue. The values representing each queue are constantly updated by all the nodes 4 upon receiving the FBP 23 in the feedback subperiod 20. At any given time, a node 4 cannot be positioned in both queues. The node 4 can be waiting in the CRQ to send an ARP 25, waiting in the DTQ to send a data packet 26, or in none of them. Nodes 4 queued at any of the queues need to turn on the radio 12 during the feedback subperiod in order to update their position in the queues. However, nodes 4 that do not have data packets to send can remain with their radios 12 off, therefore saving energy.

The CRQ is used to enable access to the network by resolving collisions occurring in the ARP 25 mini-slots. End nodes that have transmitted an ARP in any of the ARP 25 mini-slots of the current time slot 19, and have received negative feedback (collision occurrence notification) from the gateway 2 through the FBP 23, enter the CRQ at the last positions. In a particular embodiment, the position at which a node enters the CRQ depends on which minislot was used for the ARP 25 transmission. For example, if the first minislot was selected, the node 4 enters the CRQ at the last position plus one. If the third minislot was selected, the node 4 enters the CRQ at the last position plus three. When the nodes 4 reach the first position of the CRQ, they are allowed to send an ARP 25 in the access subperiod 21. When an ARP 25 from the node 4 at the head of the CRQ is successfully transmitted to the gateway, the rest of the nodes 4 queued at the CRQ update their position.

The DTQ is used to schedule transmission of data packets 26 of nodes 4 that have already transmitted an ARP 25. Upon receiving positive feedback for an ARP 25 (either directly or after going through the CRQ), the node 4 joins the DTQ at its last position. When the node 4 gets to the first position of the queue, it is allowed to send the data packet 26 in the data subperiod 22. Whenever a data packet 26 from the node at the head of the DTQ is correctly received at the gateway 2 (and the nodes 4 are informed of this event by the FBP 23), the node 4 at the head of the DTQ leaves the queue and the rest of the nodes 4 update their position.

One of the major drawbacks of traditional distributed queuing is that the protocol requires all nodes 4 to listen to the medium during the feedback subperiod 20 at all times. With the present invention, nodes 4 that do not have data packets 26 to transmit, can remain with their radio 12 turned off during the feedback subperiod 20 until a data packet 26 is ready to be transmitted. Furthermore, only the node 4 at the head of the DTQ turns on the radio 12 during the data subperiod 22. Also, among nodes 4 in the CRQ, only nodes 4 at the head of said queue turn on the radio during the access subperiod, further reducing overall energy consumption.

Figure 6:
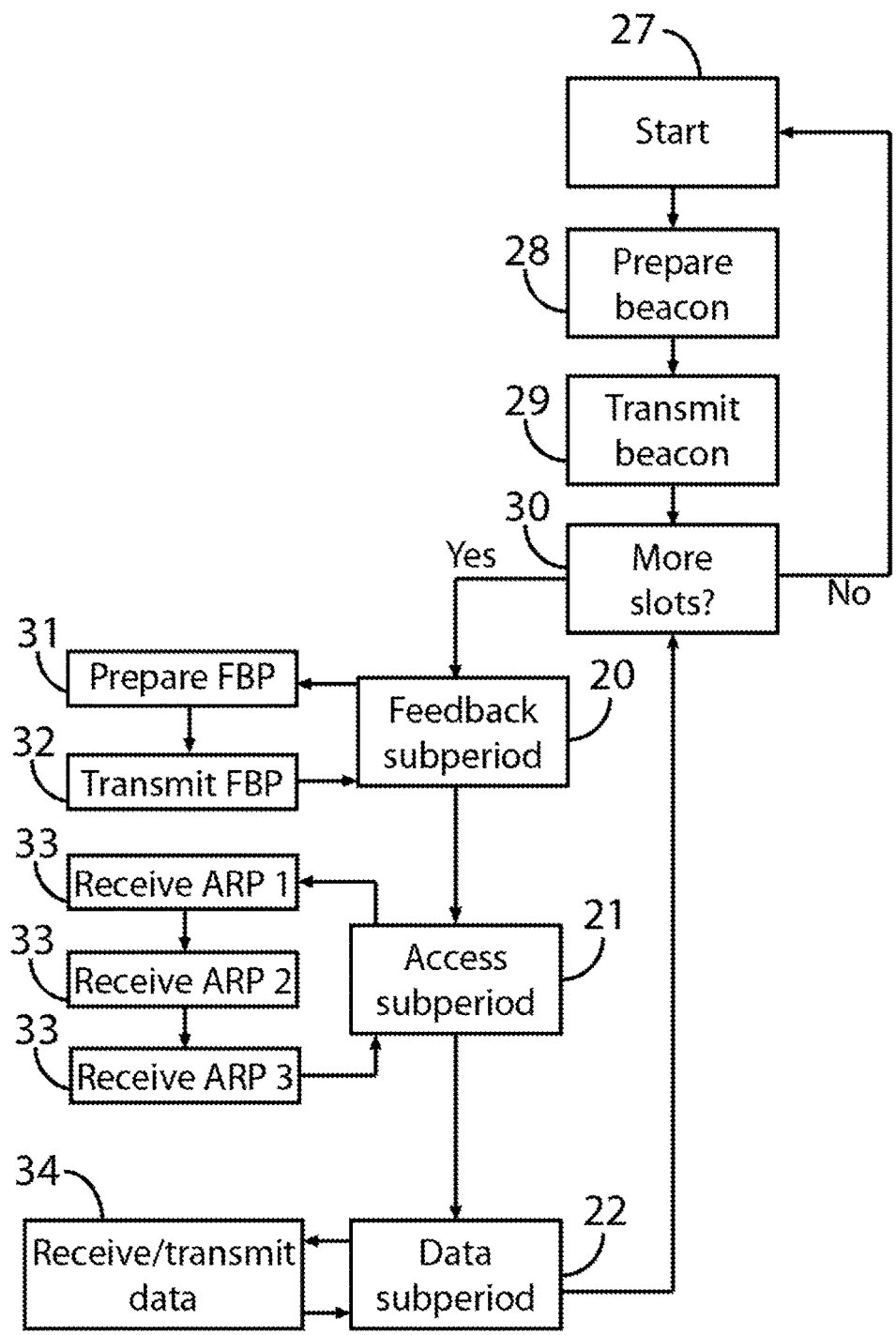
FIG. 6 is a flow diagram of the steps followed by a gateway.

FIG. 6 presents a flow diagram of the gateway 2 operation. The gateway 2 starts 27 its operation and prepares 28 and transmits 29 the beacon 17. Then, the gateway 2 checks 30 if the frame 18 comprises any more time slots 19. If the frame 18 does not comprise any more time slots 19, the gateway 2 starts 27 its operation again. Otherwise, the gateway begins the feedback subperiod 20, in which it prepares 31 and transmits 32 the FBP 23. Then, in the access subperiod 21, the gateway listens to the medium to receive 33 ARP 25 from the nodes. Finally, in the data subperiod 22, the gateway receives or transmits 34 data packets 26 depending if current time slot 19 is uplink or downlink, and then goes back to checking if the current frame 18 comprises more time slots 19.

Figure 7:
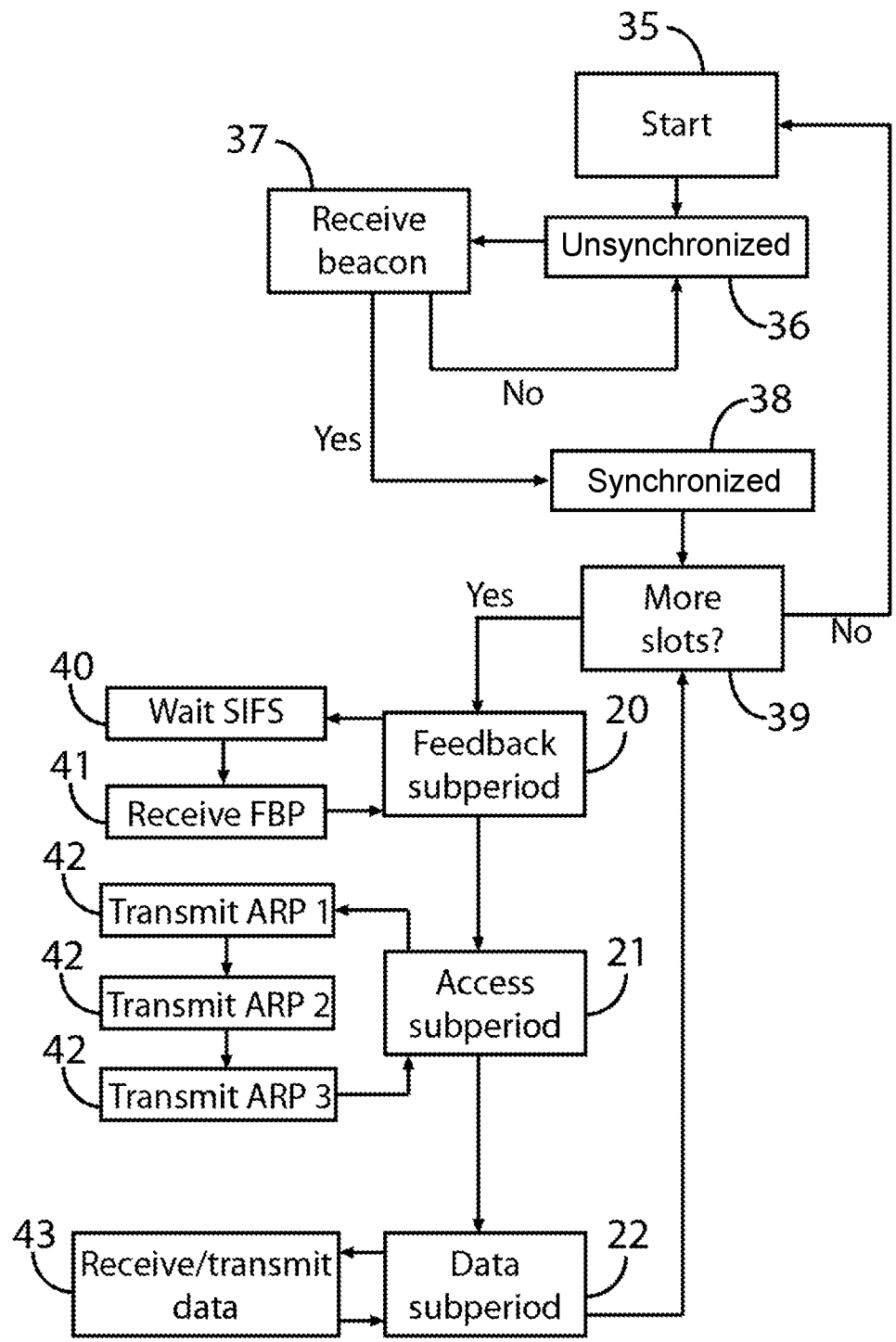
FIG. 7 is a flow diagram of the steps followed by a node.

FIG. 7 presents a flow diagram of the node 4 operation. The node 4 starts 35 operation in an unsynchronized state 36, in which remains until beacon 17 reception 37. Once synchronized 38, the node 4 check 39 if there are more time slots 19 in the current frame 18. If not, the node goes back to the start 36 of its operation. Otherwise, the node 4 starts the feedback subperiod 20, and waits 40 during the SIFS 24 in order to allow the gateway 2 to prepare the FBP 23, and then the node 4 receives 41 said FBP. If the node 4 has data packets 26 to send, the node sends 42 ARP 25 during the access subperiod 21. Then, in the data subperiod 22, the node receives 43 data packets 26 in downlink time slots 19, and transmits 43 data packets 26 in uplink time slots 19 (after going through the DTQ).

The MAC protocol comprises additional rules regarding packet transmission and queues management. First, regarding the transmission of ARPs 25, a node 4 can transmit an ARP 25 if there are no collisions pending resolution (CRQ is empty), and the node is not waiting in any of the two queues. If the ARP 25 transmission results in a collision, and the node 4 enters the CRQ, the node 4 is only allowed to transmit an ARP 25 once it reaches the head of the CRQ. Regarding the transmission of data packets 26, a node 4 can only transmit a data packet 26 if and only if its position in the DTQ is at the head of said DTQ.

Upon receiving a FBP 23, all nodes 4 that are currently in either the CRQ or the DTQ update the status of their respective queues according to the information comprised in the FBP 23. The length of the DTQ is increased by one unit for each ARP 25 successfully received by the gateway. The length of the DTQ is decreased by one unit for each data packet 26 successfully received by the gateway. If there are pending collisions to be resolved, decrement the value of the node position in the CRQ by one unit to account for the collision resolution attempted during the current time slot 19 by the nodes 4 at the head of the queue.

If a node 4 transmits an ARP 25 in the current time slot 19, and a collision occurs, the node 4 positions itself at the last position of the CRQ, that is, sets its position in the CRQ to an integer greater than the previous length of the CRQ. If a node 4 transmits an ARP 25 and its successfully received at the gateway 2 without collisions, the node 4 positions itself at the end of the DTQ.

If a node is already waiting in the CRQ, it decreases its position by one unit (considering the head of the queue to be position 1), then increases its position by one unit for each ARP 25 that has been marked as a collision in the current access subperiod 21. If a node 4 is waiting in the DTQ, the node 4 decrements its position by one unit for each data packet successfully received by the gateway.

Figure 8:
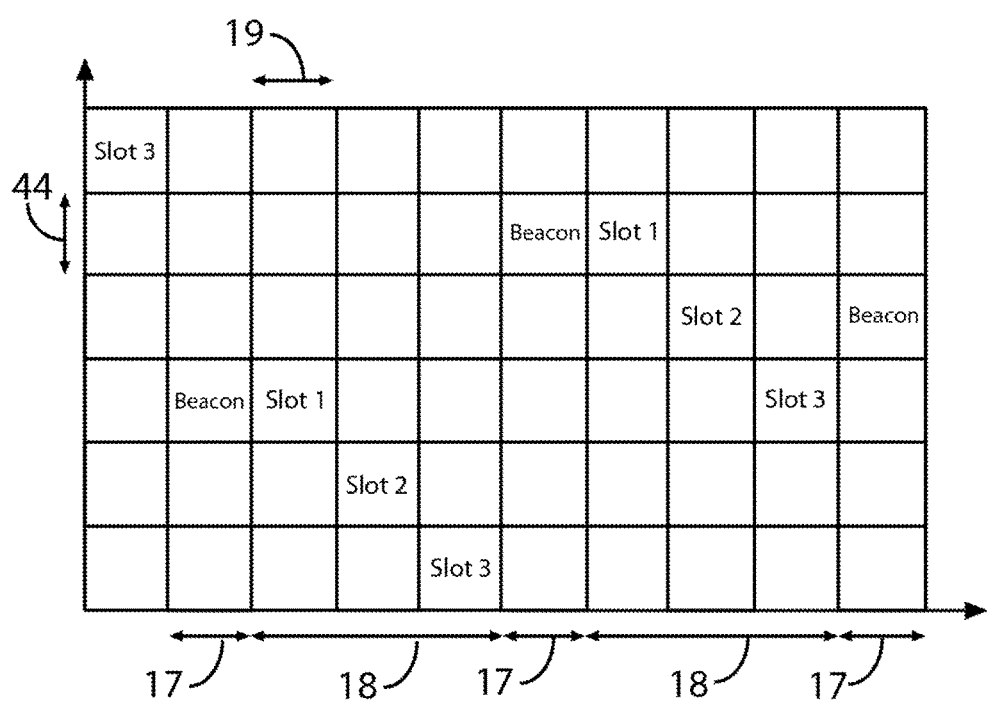
FIG. 8 presents an example of frequency hopping following a particular embodiment of the invention.

FIG. 8 presents the channel hopping implemented by the invention in order to mitigate interference from adjacent networks operating in the same or adjacent bands, as well as add robustness against multipath propagation, in which each time slot 19 of a frame 18 is transmitted over a different channel 44, e.g. at different frequencies. To implement this per-slot channel hopping scheme, the beacon 17 transmitted by the gateway 2 comprises an identifier for the next channel 44, and a pseudo-random pattern. The nodes 4 use the identifier and the pseudo-random pattern to calculate at which frequency each slot will take place. This also enables turning off the radio 12 of the nodes 4 during certain time slots 19, and still be able to receive time slots 19 in their correct channel 44 after turning on the radio 12 again. A simple approach to calculate the frequency of each slot 19 is to transmit the first slot 19 at the channel 44 indicated by the identifier, and then apply the pseudo-random pattern as relative channel offsets of the following slots 19. Nevertheless, the expert in the field will recognize that other approaches to communicate the channels 44 of the time slots 19 in the beacon 17 can be taken within the scope of the present invention as it has been claimed.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader to understand the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for sending and receiving data in a wireless machine to machine network, the wireless machine to machine communication network comprising at least one gateway (2) and a plurality of nodes (4) sharing at least a common transmission frequency, the communications between the at least one gateway (2) and the plurality of nodes (4) is organized in frames (18), repeated along time, each frame comprising a plurality of time slots (19) of a fixed length, the time slots (19) including uplink time slots (19) and downlink time slots (19), characterized in that within each frame (18), each time slot (19) is transmitted over a different frequency and in that the method comprises:
sending feedback information (23) from the gateway (2) to the nodes (4), during a first subperiod (20) of the uplink time slots (19), indicating if collisions occurred during the preceding time slot;
sending data transmission requests (25) from the nodes (4) to the gateway (2) during a second subperiod (21) of the uplink time slots (19);
sending data transmissions (26) from the nodes (4) to the gateway (2) during a third subperiod (22) of the uplink time slots (19);
determining at the gateway (2) if a collision occurs during the second subperiod (21), the collision occurring when multiple data transmission requests (25) simultaneously to the gateway by different nodes;
if the data transmission requests (25) are received at the gateway (2) without collisions, positioning the nodes (4) sending the data transmission requests (25) in a first queue, the first queue defining the position in which a queued node is allowed to send a data transmission (26);
if the data transmission requests (25) result in collisions, positioning the nodes (4) sending data transmission requests (25) in a second queue, the second queue defining the position in which a queued node is allowed to send a data transmission request (25);
the method further comprising, the gateway transmitting, preceding each frame, a control signal (17) including information about which time slots of the frame are reserved for downlink data transmissions, and which time slots are reserved for uplink data transmissions, including also synchronization information used by the plurality of nodes for synchronizing and including also information about the sequence of frequency over which the time slots of the frame are transmitted.

2. A method according to claim 1, the step of determining if a collision occurs during the second subperiod (21) further comprising an energy detection and a redundancy check validation.

3. A method according to claim 1, wherein the second subperiod (21) is divided into a plurality of time divisions, and wherein the feedback information (23) indicates if collisions occur in each of the time divisions.

4. A method according to claim 1, the feedback information (23) further comprising information regarding if a data transmission (26) is successfully received at the gateway (2) in the preceding time slot (19), and the method further comprising modifying the position of the nodes (4) queued in the first queue according to said feedback information.

5. A method according to claim 4, further comprising scheduling turning off communication means (12) of all nodes during the third subperiod (22) except for the node at the head of the first queue.

6. A method according to claim 1, further comprising scheduling turning off communication means (12) during the second subperiod (21) of all nodes (4) queued in the second queue, except for the node (4) at the head of said second queue.

7. A method according to claim 1 where the control signal also comprises an identifier of the frequency used in the first time slot of a frame and a pseudo-random pattern, and the method further comprises the plurality of nodes (4) using the identifier of the frequency used in the first time slot of a frame and the pseudo-random pattern to calculate the transmission frequency of each time slot of the frame.

8. A method according to claim 7 where the pseudo-random pattern determines the frequency offset between each time slot of the frame.

9. A method according to claim 1, wherein the data transmission requests (25) are transmitted using a first modulation, and the data transmissions (26) and feedback information (23) are transmitted using a second modulation, being the first modulation less robust against interferences from other nodes.

10. A method according to claim 1, wherein the feedback information (23) further comprises a confirmation from the gateway (2) regarding a presence or an absence of errors in uplink data transmissions.

11. A method according to claim 1, further comprising individually selecting the transmission frequency of each time slot (19) among a plurality of transmission frequencies.

12. A gateway (2) for a wireless machine to machine communication network, the wireless machine to machine communication network comprising a plurality of nodes (4) sharing at least a common transmission frequency with the gateway (2),the communications between the gateway (2) and the plurality of nodes (4) is organized in frames (18), repeated along time, each frame comprising a plurality of time slots (19) of a fixed length, the time slots (19) comprising uplink time slots (19) and downlink time slots (19), characterized in that within each frame (18) each time slot (19) is transmitted over a different frequency and in that the gateway (2) comprises a memory (13) storing data and processor executable code and a CPU (11), the processor executable code when executed by the CPU (11) configures the gateway to:
send feedback information (32) to the nodes (4), during a first subperiod (20) of the uplink time slots (19), the feedback information (32) indicating if a collision occurred during the second subperiod (21) of the preceding time slot (19); said information determining if the nodes (4) sending data transmission requests (25) are to be queued either in a first queue, which defines the position in which a queued node (4) is allowed to send a data transmission (26) if the node has sent a data transmission request in the second subperiod of the preceding uplink time slot (21) and said data transmission request has been received in the gateway without collision, or in a second queue which defines the position in which a queued node (4) is allowed to send a data transmission request (25) if the node has sent a data transmission request in the second subperiod of the preceding uplink time slot (21) and said data transmission request has resulted in collision;

receive data transmission requests (33) from the nodes (4) to the gateway (4) during the second subperiod (21) of the uplink time slots (19);

receive data transmissions (34) from the nodes (4) during a third subperiod (22) of the uplink time slots (19);

determine if a collision occurs during each mini-slot of the second subperiod (21), the collision occurring when multiple data transmission requests (25) are sent to the gateway simultaneously by different nodes;

transmitting, preceding each frame, a control signal (17) including information about which time slots of the frame are reserved for downlink data transmissions, and which time slots are reserved for uplink data transmissions, including also synchronization information used by the plurality of nodes for synchronizing and including also information about the sequence of frequency over which the time slots of the frame are transmitted.

13. A node (4) for a wireless machine to machine communication network, the wireless machine to machine communication network comprising a plurality of nodes (4) sharing at least a common transmission frequency with a gateway (2), the communications between the gateway (2) and the plurality of nodes (4) is organized in frames (18), repeated along time, each frame comprising a plurality of time slots (19) of a fixed length, the time slots (19) comprising uplink time slots (19) and downlink time slots (19), characterized in that within each frame (18) each time slot (19) is transmitted over a different frequency and in that the node (4) comprises a memory (13) storing data and processor executable code and a CPU (11), the processor executable code when executed by the CPU (11) configures the node to:

receive feedback information (41) from the gateway (2), during a first subperiod (20) of the uplink time slots (19), the feedback information (23) stating if a collision caused by multiple data transmission requests (25) being sent to the gateway simultaneously by different nodes during the second subperiod of the preceding uplink time slot (21) occurs;

according to the received feedback information (23), determining that the node (4) is to be queued either in a first queue which defines the position in which a queued node (4) is allowed to send a data transmission (26), if the node has sent a data transmission request in the second subperiod of the preceding uplink time slot (21) and said data transmission request has been received in the gateway without collision, or determining that the node (4) is to be queued in a second queue which defines the position in which a queued node (4) is allowed to send a data transmission request (25), if the node has sent a data transmission request in the second subperiod of the preceding uplink time slot (21) and said data transmission request has resulted in collision;

send data transmission requests (42) to the gateway (2) during a second subperiod (21) of the uplink time slots (19), and to send data transmissions (26) to the gateway (2) during a third subperiod (22) of the uplink time slots (19);

receive from the gateway, preceding each frame, a control signal (17) including information about which time slots of the frame are reserved for downlink data transmissions, and which time slots are reserved for uplink data transmissions, including also synchronization information used by the plurality of nodes for synchronizing and including also information about the sequence of frequency over which the time slots of the frame are transmitted.

14. A machine to machine wireless communication network comprising at least one gateway (2) and a plurality of nodes (4) sharing at least a common transmission frequency, the communications between the at least one gateway (2) and the plurality of nodes (4) is organized in frames (18), repeated along time, each frame comprising a plurality of time slots (19) of a fixed length, the time slots (19) comprising uplink time slots (19) and downlink time slots (19), wherein within each frame (18) each time slot (19) is transmitted over a different frequency and in that and wherein the nodes (4) are configured to:

send data transmission requests (25) during a second subperiod (21) of the uplink time slots (19);

send data transmissions (26) during a third subperiod (22) of the uplink time slots (19); characterized in that:

at least one gateway (2) is configured to determine if a collision occurs during the second subperiod (21), the collision occurring when multiple data transmission requests (25) are sent to the gateway (2) simultaneously by different nodes; and to send feedback information (23) to the nodes (4), during a first subperiod (20) of the subsequent uplink time slots (19), indicating if collisions occur;

the nodes (4) are further configured to, according to the feedback information (23), determine if the node (4) is to be queued either in a first queue which defines the position in which a queued node (4) is allowed to send a data transmission (26), if the node has sent a data transmission request in the second subperiod of the preceding uplink time slot (21) and said data transmission request has been received in the gateway without collision, or in a second queue which defines the position in which a queued node (4) is allowed to send a data transmission request (25), if the node has sent a data transmission request in the second subperiod of the preceding uplink time slot (21) and said data transmission request has resulted in collision;

the gateway being further configured for, preceding each frame, transmitting a control signal (17) including information about which time slots of the frame are reserved for downlink data transmissions, and which time slots are reserved for uplink data transmissions, including also synchronization information used by the plurality of nodes for synchronizing and including also information about the sequence of frequency over which the time slots of the frame are transmitted.

15. A non-transitory computer readable medium comprising a computer program comprising computer program code adapted to perform the steps of the method according to claim 1 when said program is run on a computer, a digital signal processor, a field-programmable gate array, an application-specific integrated circuit, a micro-processor, a micro-controller, or any other form of programmable hardware.

\* \* \* \* \*